UNITED STATES PATENT OFFICE.

JOHN CLIFFORD, OF CHICAGO, ILLINOIS, AND CHARLES WEELANS, OF TRENTON, NEW JERSEY, ASSIGNORS TO MONUMENT POTTERY COMPANY, OF TRENTON, NEW JERSEY, A CORPORATION OF NEW JERSEY.

PROCESS OF MANUFACTURING LAVATORY-BASINS OR OTHER EARTHENWARE ARTICLES.

No. 929,390.     Specification of Letters Patent.     Patented July 27, 1909.

Application filed October 19, 1907. Serial No. 398,189.

*To all whom it may concern:*

Be it known that we, JOHN CLIFFORD, a citizen of the United States, residing in Chicago, in the county of Cook and State of Illinois, and CHARLES WEELANS, a citizen of the United States, residing in Trenton, in the county of Mercer and State of New Jersey, have invented a new and useful Improvement in Processes of Manufacturing Lavatory-Basins and other Earthenware Articles, of which the following is a specification.

Our invention relates to improvements in the art or process of manufacturing lavatory bowls, closet basins and other earthenware articles.

Heretofore, lavatory bowls, closet-basins and other earthenware articles used in plumbing work have customarily been shaped or made by hand on a single walled form or mold of plaster of paris, which gives shape to the article on one side, while its shape on the other side, and required thickness are formed by hand according to the skill and judgment of the workman, the plastic clay being applied in separate sheets or pieces until the article is built up of the required complete shape and configuration, and the separate pieces properly joined or united at their meeting edges by manipulation of the workman with his hands or fingers. This process of manufacture is slow and expensive, and requires specially skilled workmen and is necessarily attended with the production of defective and imperfect articles and material variations in size, shape and thickness, due to carelessness or from improper joining of the separate sheets or pieces of clay at their meeting edges. Any defective or imperfect union or joining of the separate sheets or pieces of clay at their meeting edges in the forming operation while the clay is plastic, resulting in an air pocket, ordinarily produces a worthless or defective article when it is subsequently fired, because however small the air pocket, the heat of the firing operation expands the air and causes a fracture in its efforts to escape. And in addition, the old process requires an expensive and laborious preliminary treatment of the clay to bring it to a proper plastic state for such hand manipulation. This preliminary treatment ordinarily comprises, first, the laborious mixing of the dry clay materials with water to bring it to a fluid state by being cast into a plunger with revolving arms in order to mix it thoroughly, after which it is run off on a wire screen or lawn to separate from the liquid mixture or slip the sand, stones and extraneous materials. It then is run into a receiver which is also kept revolving in order to keep the various minute particles of the slip or substance together, after which it is pumped into a filter press by force until a sufficient amount of the water has been separated by the filter press from the mixture to reduce it to the plastic state, after which it is taken from the filter press and stored for the aging or curing process, the same ordinarily requiring from four to ten days. It is then put through a pug mill in order that the whole may be brought to a homogeneous mass, thus making it ready for the workman's use.

The object of our invention is to provide a process by means of which lavatory bowls, closet basins and other like earthenware articles may be rapidly and cheaply manufactured and articles produced of uniform and proper shape and thickness and of a homogeneous character throughout, free from the imperfections and defects heretofore experienced, without the labor and expense of skilled hand shaping and manipulation or working and at the same time save or eliminate much of the preliminary laborious and expensive treatment of the clay to bring it to a plastic or workable state for hand manipulation.

Our invention consists in the method or means we employ to practically accomplish this object or result; that is to say, it consists in adding to and mixing with the ordinary clay, flint and spar mixture, either before or after it comes from the plunger and either before or after the liquid mixture passes in a liquid state through the filter screen or lawn, a solution of silicate of potash, and of carbonate of potash and water sufficient to give the necessary increased plasticity to the mixture and the necessary quickly setting properties or characteristics to the mixture to enable it to be cast of the desired shape by simply pouring it into a double walled plaster of paris mold; then pouring the mixture into plaster of paris molds of the necessary form to give the required shape and configuration to both sides of the article to be produced, until the mold or molds are filled; then from time to time as the moisture is in part absorbed from the contents of the mold and the same settles down in the mold, pouring additional mixture material into the mold, this refilling operation being repeated ordinarily from three to six times, and care being taken to repeat the pouring operation at sufficiently near intervals to secure homogeneous union between the separate pourings, and the repeated pourings being continued until the contents of the mold becomes sufficiently set or hardened to prevent further downward settling of the contents of the mold; after which the mixture is allowed to remain in the plaster mold until the article thus cast or molded is sufficiently strong to permit the removal of the plaster mold without injury thereto. The lavatory bowl or other earthenware article thus cast or molded after being removed from the mold is then dried in the usual manner before firing and finally fired.

If it is desired to employ in practicing our invention a clay mixture already in a plastic state, such as is now used for hand molding or manipulation, we add thereto the solution of silicate of potash and carbonate of potash and water in sufficient quantity to reduce the plastic clay mixture to a sufficiently fluid or liquid state to cause the same to readily pour into the plaster of paris molds and then proceed as above described.

By this means or process, we are enabled to produce earthenware lavatory bowls, closet basins and other like articles very rapidly and cheaply and much more perfectly than those now ordinarily produced by the hand prosesses heretofore in use.

The quantity of silicate of potash and carbonate of potash which we add to a clay mixture already in a plastic state to give it the property or capability of being poured for casting into molds and perfect articles produced by casting, varies somewhat with the nature of the clay mixture used. Ordinarily we make the silicate of potash, carbonate of potash and water solution in the proportion of about one pound of the silicate of potash in solid form to one pound of carbonate of potash to about sixty pounds or seven and one half gallons of water, and this amount of the solution is ordinarily sufficient for about eight hundred pounds of clay mixture in a plastic state. If the clay mixture is already in a liquid state, the water is proportionately reduced.

In practicing our invention we prefer to add the solution of silicate of potash and carbonate of potash to the clay mixture after it has been passed in liquid form through the customary wire screen or lawn. And as the clay mixture at this stage is already in a liquid form, though not of proper consistency for pouring and casting, we add to the silicate of potash and carbonate of potash simply sufficient water for complete solution of both and then mix this solution to the liquid clay mixture or slip which brings the resulting mixture to proper consistency for pouring and casting in the molds.

The function or purpose of the carbonate of potash in the clay mixture is to increase the fluidity of the clay mixture and reduce the quantity of water otherwise required to produce necessary fluidity for successful casting and pouring, so that the plaster of paris mold will successfully absorb or withdraw the water or moisture from the mixture in the casting operation and thus render successful casting practicable. The function or purpose of the silicate of potash in the clay mixture is to give additional bond and elasticity and cohesiveness to the clay mixture and thus enable the mixture to set and harden quickly into a perfect casting without fracture or injury, and it also serves in the nature of a flux in the subsequent firing operation. Both the silicate of potash and carbonate of potash are essential ingredients to successful operation and the production of best results.

We hereby disclaim as not of our invention, the use of carbonate of soda and silicate of soda as set forth in the Alfred Johnson Patent No. 839,150 of Dec. 25, 1906. In our invention, the carbonate of potash and silicate of potash in our clay mixture enables the pouring operation of the mixture in the molds to be repeated as required at intervals as the mixture in the molds settles down from absorption of moisture therefrom by the mold and a complete fusion or union between the separate pourings to take place without any tendency to cause a seam or line or surface of weakness or cleavage between the separate pourings. In our invention also, the carbonate of potash and silicate of potash in our clay mixture serves to materially reduce the amount of heat required in the subsequent firing operation from that required where carbonate of soda and silicate of soda are used, and thus effects a material saving in fuel and cost of labor in the firing operation. In our invention also, the carbonate of potash and silicate of potash possesses material advantages over the use of carbonate of soda and silicate of soda, as a materially less amount of the carbonate of potash and silicate of potash is required to be added to the clay mixture, than is the case with the carbonate of soda and silicate of soda; and this is of great practical advantage as the smaller the amount of either of such materials necessary to add to the clay mixture to produce the desired results, the better; because the clay mixture becomes more stubborn in character and affords greater resistance in the lawning, maturing or refining process the more of such materials are mixed therewith.

We claim:—

1. The method or process of manufacturing earthenware articles, consisting in first adding to and mixing with the clay mixture, a solution of silicate of potash and carbonate of potash, and then pouring the mixture thus formed in a liquid state into plaster of paris mold until the same is filled, repeating the pouring operation at intervals as the mixture in the mold settles down, from absorption of moisture therefrom by the mold and then allowing the mixture to set and harden in the mold until of sufficient strength to permit removal of the mold without injury, substantially as specified.

2. The method or process of manufacturing earthenware articles, consisting in first adding to and mixing with the clay mixture, a solution of silicate of potash, and then pouring the mixture thus formed in a liquid state into plaster of paris mold until the same is filled, repeating the pouring operation at intervals as the mixture in the mold settles down from loss of moisture, and then allowing the mixture to set and harden in the mold until of sufficient strength to permit removal of the mold without injury, substantially as specified.

JOHN CLIFFORD.
CHARLES WEELANS.

Witnesses:
 EDMUND ADCOCK,
 H. M. MUNDAY.